United States Patent [19]
Weiler et al.

[11] Patent Number: 5,257,679
[45] Date of Patent: Nov. 2, 1993

[54] SPOT-TYPE DISC BRAKE AND BRAKE SHOE

[75] Inventors: Rolf Weiler, Eppstein; Uwe Bach, Niedernhausen; C. Peter Panek, Steinbach, all of Fed. Rep. of Germany

[73] Assignee: Alfred Teves GmbH, Frankfurt am Main, Fed. Rep. of Germany

[21] Appl. No.: 867,711

[22] PCT Filed: Oct. 26, 1991

[86] PCT No.: PCT/EP91/02027
§ 371 Date: Jul. 8, 1992
§ 102(e) Date: Jul. 8, 1992

[87] PCT Pub. No.: WO92/08908
PCT Pub. Date: May 29, 1992

[30] Foreign Application Priority Data
Nov. 13, 1990 [DE] Fed. Rep. of Germany ....... 4036063
Sep. 19, 1991 [DE] Fed. Rep. of Germany ....... 4131130

[51] Int. Cl.[5] .............................................. F16D 55/00
[52] U.S. Cl. ................................ 188/73.32; 188/72.5; 188/250 B
[58] Field of Search ................... 188/72.5, 73.1, 73.31, 188/73.32, 73.38, 73.39, 250 B

[56] References Cited

U.S. PATENT DOCUMENTS
4,392,559 7/1983 Oshima .............................. 188/73.32
4,394,891 7/1983 Oshima .............................. 188/73.38

FOREIGN PATENT DOCUMENTS
1475288 4/1969 Fed. Rep. of Germany .
2038649 2/1971 Fed. Rep. of Germany .
2223829 12/1972 Fed. Rep. of Germany .
1480028 4/1973 Fed. Rep. of Germany .
2845575 3/1979 Fed. Rep. of Germany .
037305 10/1981 Fed. Rep. of Germany .
3445488 2/1986 Fed. Rep. of Germany ... 188/73.38
8707967 9/1987 Fed. Rep. of Germany .
3621507 1/1988 Fed. Rep. of Germany ... 188/73.38
3833734 5/1989 Fed. Rep. of Germany .
3833553 8/1989 Fed. Rep. of Germany .
336103 10/1989 Fed. Rep. of Germany .
828961 2/1960 United Kingdom ............. 188/73.32
953323 3/1964 United Kingdom ............. 188/73.32
2036211 6/1980 United Kingdom ............. 188/73.38

Primary Examiner—Mark T. Le
Attorney, Agent, or Firm—Robert P. Seitter; J. Gordon Lewis

[57] ABSTRACT

A spot-type disc brake in which a two part brake housing forms a central radial cavity open at the outside which allows the brake shoes to be removed through the cavity without disassembly of the housing. The brake shoes are engaged by surfaces on short height projection pairs protruding into the cavity from either side, the surfaces machined with a radiused shape concentric with the actuator cylinder bores to facilitate manufacture. The short height allows the radiused shape without preventing removal of the brake shoes. In a first embodiment, the projections are also formed with outer tangential surfaces, with surfaces on the brake shoes urged thereagainst with a retained spring. In a second embodiment, a holding pin extends across the central cavity and through bores at the outside of each brake shoe, a retainer spring engaged with the holding pin and brake shoes.

9 Claims, 2 Drawing Sheets

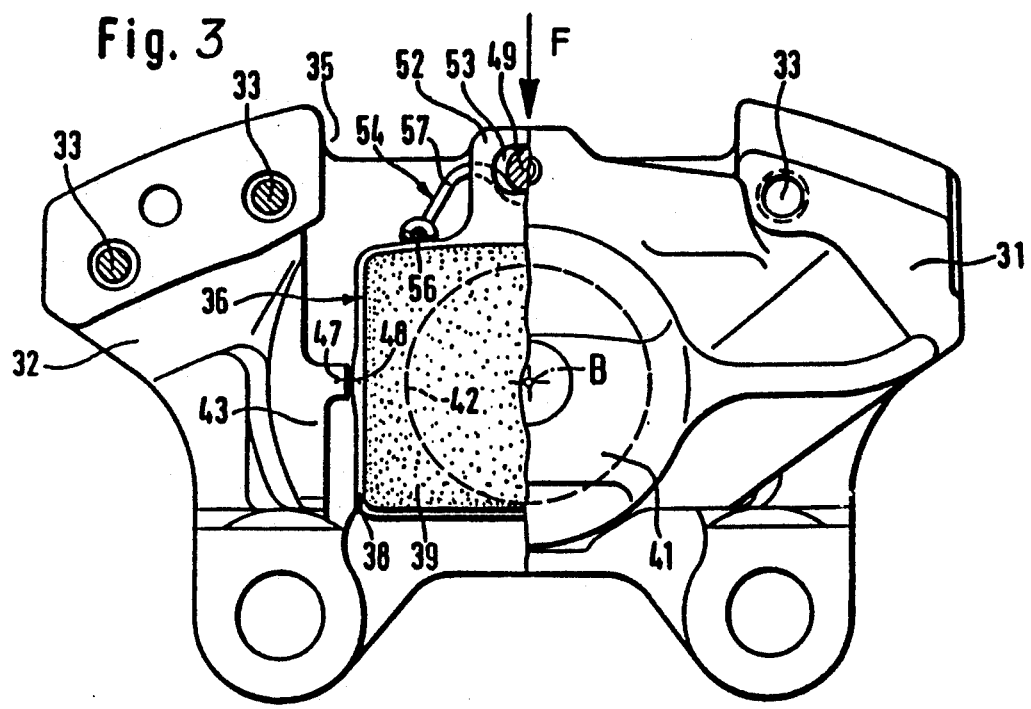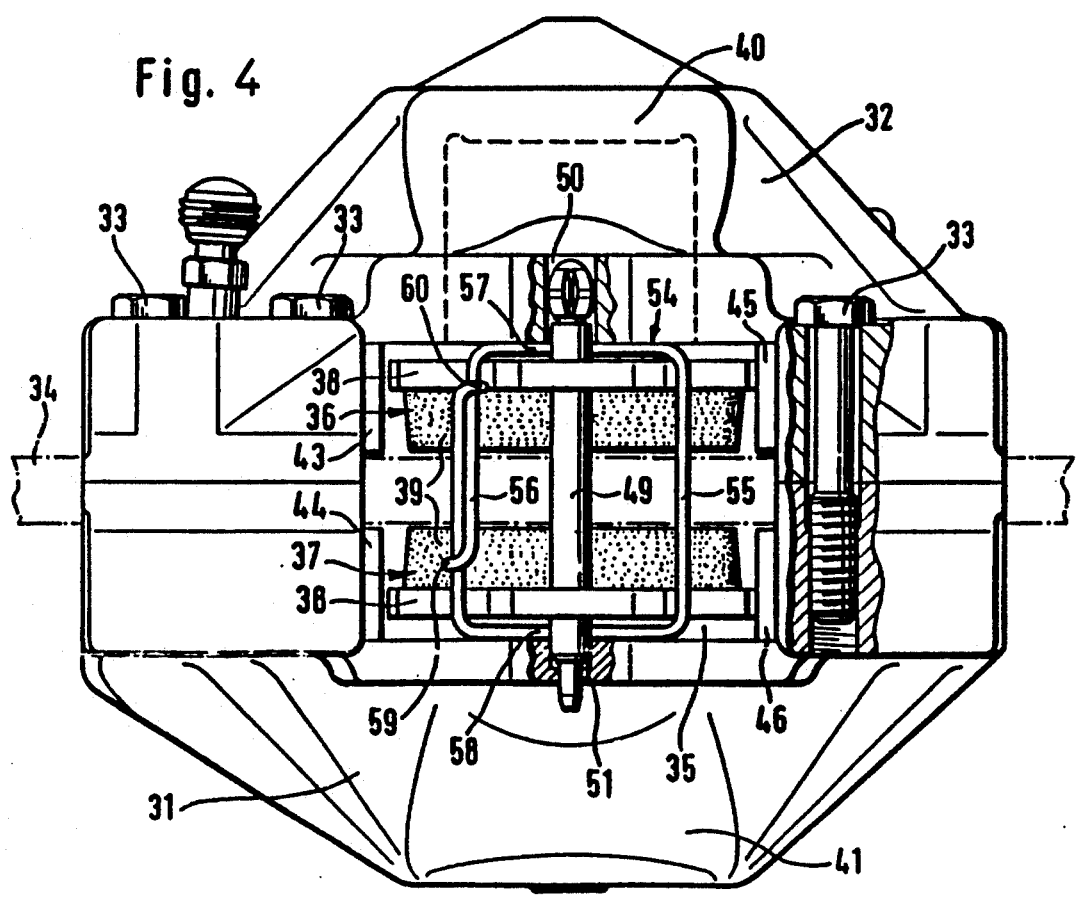

SPOT-TYPE DISC BRAKE AND BRAKE SHOE

BACKGROUND OF THE INVENTION

This invention relates to the support of brake shoes in a spot-type disc brake and to the associated brake shoes. A spot-type disc brake of the type with which the present invention is related is shown in German Published Patent Application DE-OS No. 38 33 553. In this type of brake it is possible to remove the brake shoes radially outwards from an open, radially extending cavity of the brake housing, without the brake housing having to be dismantled or swung out of position. The circumferential forces ensuing upon a brake application are transmitted by the brake shoes to axial brake housing projections provided with plane supporting surfaces which face the cavity in the circumferential direction and whereon the brake shoes rest. Holding pins are provided in order to secure the brake shoes against being displaced in the radial direction, the holding pins axially extending across the radially outer area of the cavity and being detachably fastened on the brake housing. The pad carrier plates of the brake shoes have projections with openings for receiving the holding pins. A spring detachably fastened in the area of the holding pins presses the brake shoes radially against the holding pins so as to prevent the brake shoes from rattling. The spring and the holding pins have to be removed for the purpose of removing the brake shoes.

This known spot-type disc brake has the disadvantage that in manufacturing the brake housing, considerable relatively complicated milling work has to be performed when machining the above-mentioned plane supporting surfaces for the brake shoes. The guideway and the fastening device of the brake shoes on the holding pins likewise require a considerable amount of manufacturing and assembling operations.

In another spot-type disc brake known from German published Patent Application DE-OS No. 14 75 288, supporting surfaces of circular arc shape are provided for the brake shoes, these surfaces not being milled but rather turned together with the cylinder bores of the four brake cylinders. The brake shoes are supported on the supporting surfaces both in the radial in the and circumferential directions. This solution, however, has the disadvantage that it is impossible to remove the brake shoes radially outwards. It is necessary to dismantle the brake housing for the purpose of replacing the brake shoes which causes additional assembly operations and costs incurred thereby. It is an object of this invention to provide a spot-type disc brake where the brake shoe supporting surfaces destined for receiving the circumferential forces can be turned together with the bore of the brake cylinder but where it is possible to radially remove the brake shoes through a radially outwards open brake housing cavity.

SUMMARY OF THE INVENTION

The solution of this object results when the supporting surfaces are formed on short height projections and have a radiused shape having a slightly larger radius than that of the brake cylinder, but coaxial with the brake cylinder axis. This arrangement permits the supporting surfaces to be bored or turned together with the brake cylinder bore in one operation by means of a stepped tool having different radii in different axial areas. This results in an advantageous elimination of the separate milling operation of the supporting surfaces and of the manufacturing cost incurred thereby.

At the same time, the radiused supporting surfaces in accordance with this invention are substantially centered on a line passing through the center of the brake center and normal to the brake disc radius, and have a short radial height, with a limited radial dimension, minimized so as to allow the brake shoes to be removed radially through the cavity. This lowers the cost of assembly and maintenance.

The short height supporting surfaces have the further advantage of reducing susceptibility to corrosion of the brake shoe holding device.

It is possible to eliminate the holding pins for the brake shoes if further supporting surfaces are provided on the brake housing projections in order to support the brake shoes in the radial direction. The brake shoes are pressed against the further supporting surfaces by means of a spring which acts in the direction of the brake disc axis. This results in an elimination of the manufacturing cost of the holding pins and associated bores in the brake housing.

In this arrangement, however, there may occur casting defects on the projections of the brake housing. If the projections surfaces for radial support are not shaped exactly true to specifications during casting, the guidance of the brake shoe will be impaired in the axial direction. This may also cause a tilting of the brake shoe and unintended grinding on the brake disc. While it might be possible to repair this defect by subsequent smoothing milling of the cast surfaces, this, however, would cause the manufacturing cost to go up.

For this case, therefore a holding pin is provided for fastening and guiding the brake shoes, the holding pin detachably mounted extending transversely across the radially outwards open brake housing cavity. The pad carrier plates of the brake shoes are provided with radially outwardly directed projections with openings on the projections receiving the holding pin, so that the brake shoes are guided on the holding pin in a displaceable manner in the axial direction. This solution has the advantage that the brake shoes are not guided on the radial surfaces of the projections of the brake housing. Any unevenness caused by casting thus cannot negatively affect the guidance of the brake shoes. Any subsequent surfacing will no longer be necessary.

Moreover, the brake shoes will be simplified since specific lugs of the pad carrier plates, serving as guides, become superfluous. On each of the narrow sides of the pad carrier plates which lie in the circumferential direction of the brake disc only an arc-shaped bulge is formed which, for transmitting the circumferential force, rests on the associated projection of the brake housing. A further advantage of this inventive arrangement consists in that the guidance of the brake shoes is less susceptible to corrosion.

Only one holding pin is provided in the preferred embodiment

This arrangement is particularly simple and may be made at minimum cost. In order to replace worn brake shoes with new ones, it is only necessary to loosen the single holding pin and remove the brake shoes radially outwards through the brake housing cavity.

In order to prevent the brake shoes from rattling in their guideways, a retaining spring urges the brake shoes against the holding pin. In a simple embodiment, the retaining spring is formed from spring wire and clamped between the holding pin and the brake shoes so as to be retained.

Two holding pins could be provided this arrangement is more costly and complex and is only recommended should there be operational difficulties in a particular application with a single holding pin.

DESCRIPTION OF THE DRAWINGS

FIG. 3 is a lateral view in partial section of a second embodiment of a spot-type disc brake according to the invention;

FIG. 4 is a top view in partial section in direction F of FIG. 3.

DETAILED DESCRIPTION

Figure 1:
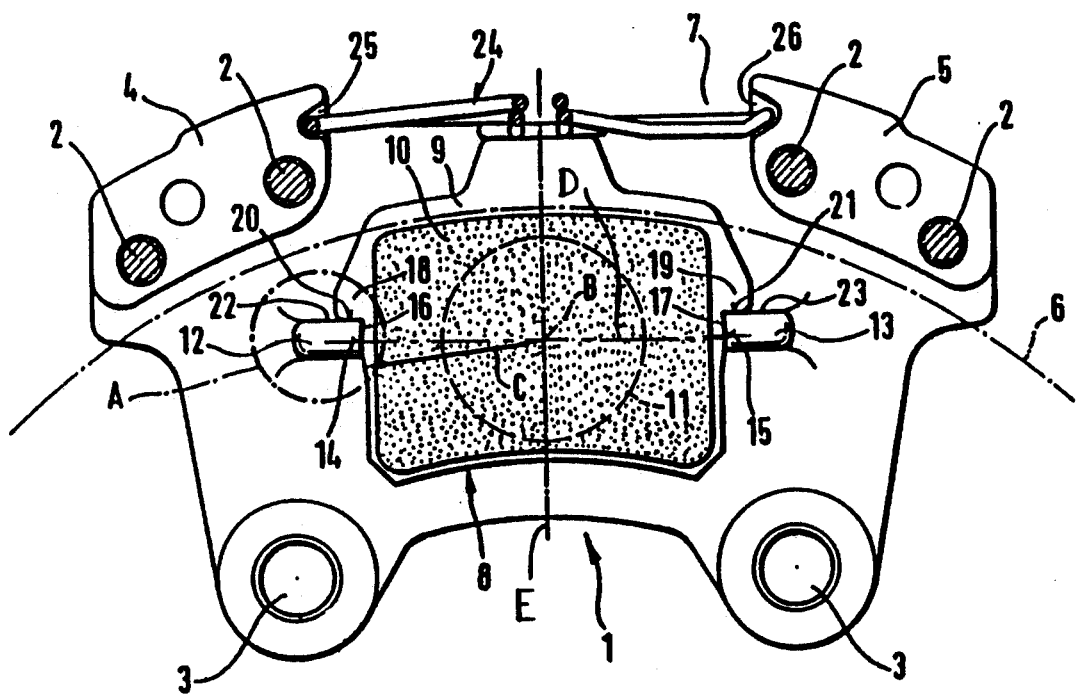
FIG. 1 is a view of one part of a two part brake housing of a first embodiment of the invention as seen from the brake disc plane.

The brake housing 1 which is illustrated in FIG. 1 is formed by two similar castings, one of which shown in FIG. 1, which are bolted together with bolts 2. Bores 3 are provided for fastening the brake housing 1 on the steering knuckle of an automotive vehicle. Two bridge sections 4, 5 project from one side of each casting towards the other casting. Together with the corresponding sections of the non-illustrated second casting, the bridge sections 4, 5 form a caliper bridge laterally straddling the brake disc. The circumferential contour of the brake disc is sketched out by the dash-dot line 6.

A radially extending cavity 7 is formed between the two bridge sections 4, 5, open at the radially outer end. It is possible to remove both brake shoes by radially outward movement or to insert them radially with inward movement through the cavity 7.

The brake shoe 8 shown consists of a pad carrier plate 9 and of a friction pad 10 fastened thereon. Upon actuation of a hydraulic actuation device, a brake piston slidingly arranged in a brake cylinder will move the brake shoe 8 until it will come to abut on the brake disc. The bore of the brake cylinder hidden by the brake shoe 8 is sketched out by the broken line 11. In the middle part of the brake housing, two short height projections 12, 13 are arranged extending in the circumferential direction of the brake disc on the illustrated first casting of the brake housing 1 as well as on the non-illustrated casting. The projections 12, 13 face each other and project axially from the major plane of the side of the casting towards the disc.

The brake shoe 8 is arranged between the projections 12, 13 on the first casting of brake housing, 1 and a second brake shoe on the other side of the disc is arranged between projections on the second casting.

Figure 2:
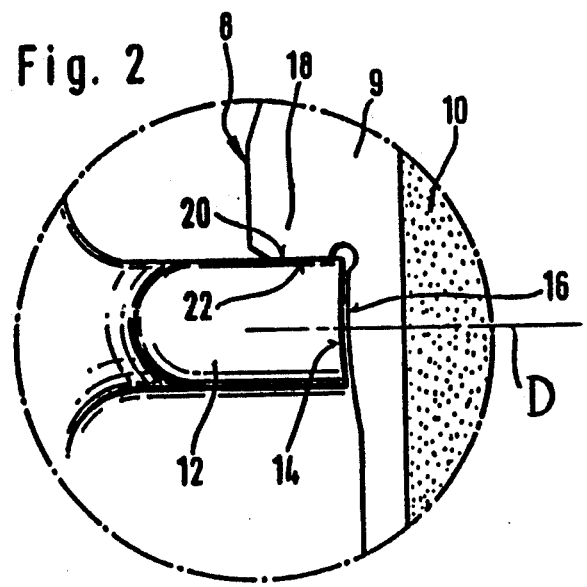
FIG. 2 is an enlarged detail marked A in FIG. 1.

As can be seen better in FIG. 2, the projections 12, 13 have engagement surfaces 14, 15 whereon abutting localized curved surfaces 16, 17 on each side of the pad carrier plates 9 are resting. Thereby, the circumferential forces the brake shoe 8 upon the application of the brake are transmitted to the brake housing 1. The engagement surfaces 14, 15 have a radiused shape whose radius C is traced in FIG. 1 and whose center line B coincides with the axis of the brake cylinder 11 sketched out by a broken line. The engagement surfaces 14, 15 directly face each other on opposite sides of the center line B, and are located on a plane D which passes through and extends parallel to the longitudinal axis of the brake cylinder 11. The plane D is also normal to the brake disc radius E that passes through the center line B. The localized curved surfaces 16, 17 of the pad carrier plate 9 are complementary to the engagement surfaces 14, 15. A clearance is created between the surfaces 14, 16 and 15, 17, respectively, by sizing the radius C slightly larger than that at the brake cylinder in order to allow for manufacturing dimensional tolerances and thermal expansion.

The engagement surfaces 14, 15 are of limited radial dimension so as to ensure that the radial removal of the brake shoe 8 through cavity 7 will not be prevented by interference with the projections 12, 13.

The pad carrier plate 9 is provided with two projections 18, 19 adjacent the areas of the abutting surfaces 16, 17, which project in the circumferential direction. The narrow sides 20, 21 of the projections 18, 19 which directly border and are perpendicular to the abutting surfaces 16, 17, rest on radially outer tangentially extending supporting surfaces 22, 23 of the projections 12, 13 of each half tangentially of the housing 1, as is best seen in FIG. 2.

The brake shoe 8 thus is also radially supported on the projections 12, 13 and is radially pressed inwards against the same by means of a wire spring 24. Wire spring 24 is anchored in recesses 25, 26 of the bridge sections 4, 5 by engaging the same. The wire spring 24 is supported on the brake housing 1, on the one hand, and on the radially outer narrow side of the pad carrier plate 9 of the brake shoe 8, on the other hand.

The brake housing of the spot-type disc brake illustrated in FIGS. 3 and 4 essentially consists of two halves 31, 32 which may be castings, connected with each other by means of bolts 33. The brake housing halves 31, 32 straddle the outer edge of the brake disc 34 and together form a radially extending intermediate cavity 35 opening to the outside through which it is possible to remove or mount the brake shoes 36, 37 arranged on either side of the brake disc 34.

The brake shoes 36, 37 in each case consist of a pad carrier plate 38 and of a friction pad 39. Upon pressurization of each of the hydraulic brake cylinders 40, 41, the brake shoes 36, 37 are pressed in the axial direction against the brake disc 34 by means of two brake pistons arranged in the brake cylinders 40, 41 and sketched out by a broken line 42 in FIG. 3.

The brake housing halves 31, 32 are each provided with two projections 43, 45 and 44, 46 extending in the axial direction of the brake disc 34, and protruding in the circumferential direction of the brake disc 34 next to the brake shoes 36, 37. The engaging surfaces 47 of the projections 43, 45 and 44, 46 which are radiused with axis B are adapted to serve as abutments for arched bulges 48 of the pad carrier plates 38, with the circumferential forces that ensue upon braking being transmitted by the brake shoes 36, 37 to the brake housing halves 31, 32. A holding pin 49 is provided for holding and guiding the brake shoes 36, 37. The holding pin 49 extends in the axial direction in the area of the cavity 35 and is detachably fastened in two bores 50, 51 of the brake housing halves 31, 32. Each of the pad carrier plates 38 of the brake shoes 36, 37 has a radially outwards protruding projection 52 with an opening 53 for passing the holding pin 49 through.

The brake shoes 36, 37 are guided and axially displaceable on the holding pin 49 and a wire spring 54 urges the brake shoes 36, 37 against the holding pin 49 so as to prevent them from rattling. The wire spring 54 has two parallel wire sections 55, 56 extending in the axial direction and pressing against the brake shoes 36, 37 on one of the narrow sides of the pad carrier plates 38. Two further curving wire sections 57, 58 run perpendicularly to and under the holding pin 49 and press against the holding pin 49.

Due to the curved shape of the wire sections 57, 58, the stressed wire spring 54 is clamped so as to be retained. In the area of the wire section 56, the two free wire ends 59, 60 both are bent in a semicircular manner and entwined together so that the wire spring 54 has a closed shape.

We claim:

1. A spot-type disc brake comprising:
a brake disc;
a brake housing having connected halves straddling said brake disc;
a radially extending open ended cavity formed in said brake housing having a radially outer open end;
a pair of brake shoes mounted within said open ended cavity of said brake housing so as to be removable radially outward; said brake shoes arranged in respective sides of said brake disc; a hydraulic actuation device mounted in each of said halves of said housing and acting directly on a respective one of said brake shoes to be pressed against one side of said disc, each said actuation device comprising a hydraulic cylinder; a pair of projections formed on each of said housing halves and extending in the axial direction of said brake disc, each said projection protruding in the circumferential direction of said brake disc and into said cavity, said projections of said pair aligned opposite each other and located on a single plane extending through and parallel to the longitudinal axis of said hydraulic cylinder, one end of each of said projections having a generally radial supporting surface of a short radial height facing said cavity for engaging a respective side of one of said brake shoes, said radial supporting surfaces being substantially centered on a line passing through said longitudinal axis of said hydraulic cylinder and normal to the radius of said brake disc, to absorb circumferential forces exerted by said brake shoes during braking thereof, each of said brake shoes having a pad carrier plate, each said pad carrier plate having a localized area on each side, said projections having limited size so as to enable a radial removal of said shoes through the opened end of said cavity.

2. A spot-type disc brake as claimed in claim 1, wherein each of said projections have generally tangentially extending supporting surfaces facing said radially outer open end of said cavity; and wherein each of said brake shoe brake pad carrier plates has corresponding tangential surfaces, on its sides, abutting against said tangential supporting surfaces, and a spring urging said corresponding tangential surfaces and said tangential supporting surfaces into engagement, said brake shoes thus secured against falling out and rattling.

3. A spot-type disc brake as claimed in claim 1, further including at least one holding pin extending parallel to the axis of said brake disc, said holding pin detachably fastened on each brake housing half and transversely extending across said radial cavity of said brake housing, and wherein each of said brake shoe carrier plates has an outwardly directed portion formed with at least one opening for receiving said holding pin there through.

4. A spot-type disc brake as claimed in claim 3, wherein only one holding pin is provided which is arranged in the middle of said cavity.

5. A spot-type disc brake as claimed in claim 3, wherein said brake shoes are prestressed with respect to said brake housing halves by means of a retaining spring resting on said holding pin.

6. A spot-type disc brake as claimed in claim 5, wherein said retaining spring comprises a formed wire spring having a rectangular shape, with two wire sections which generally run parallel and at a distance to a radially outer lateral surface of said pad carrier plate of said two brake shoes, and with two further wire section which generally run perpendicularly to said holding pin and are curved and resting against the underside of said holding pin.

7. A brake shoe, with a pad carrier plate and a friction pad, wherein said pad carrier plate has generally straight parallel sides, each side having a partially circularly shaped localized protrusion having a radius center lying at the center of said brake shoe.

8. A brake shoe as claimed in claim 7, wherein said pad carrier plate has two projections each directly next to a respective one of said projections of said housing halves and extending perpendicularly to said sides.

9. A brake shoe as claimed in claim 7, wherein said pad carrier plate is formed with a third side provided with a projection pointing parallel to said two sides and having at least one opening therein for passing a holding pin there through.

* * * * *